United States Patent
Swift

(10) Patent No.: US 9,885,555 B2
(45) Date of Patent: Feb. 6, 2018

(54) PIPELINE IDENTIFICATION AND CALIBRATION APPARATUS

(71) Applicant: Craig Alan Swift, Houston, TX (US)

(72) Inventor: Craig Alan Swift, Houston, TX (US)

(73) Assignee: Craig Alan Swift, Houston, TX (US)

( * ) Notice: Subject to any disclaimer, the term of this patent is extended or adjusted under 35 U.S.C. 154(b) by 0 days.

(21) Appl. No.: 15/190,061

(22) Filed: Jun. 22, 2016

(65) Prior Publication Data

US 2017/0370696 A1    Dec. 28, 2017

Related U.S. Application Data

(60) Provisional application No. 62/183,366, filed on Jun. 23, 2015.

(51) Int. Cl.
*G01B 7/34* (2006.01)
*F16L 58/00* (2006.01)

(52) U.S. Cl.
CPC .............. *G01B 7/34* (2013.01); *F16L 58/00* (2013.01)

(58) Field of Classification Search
CPC .................................. G01B 7/34; F16L 58/00
USPC ....................................................... 73/865.8
See application file for complete search history.

(56) References Cited

U.S. PATENT DOCUMENTS

| | | | | |
|---|---|---|---|---|
| 4,055,989 A | * | 11/1977 | Henry, Jr. ............ | G01N 23/043 73/588 |
| RE40,515 E | * | 9/2008 | Kwun .................... | G01N 29/11 324/220 |
| 8,358,134 B1 | * | 1/2013 | Hoyt .................... | E21B 47/0905 324/326 |
| 8,689,836 B2 | * | 4/2014 | Hudson ............... | B29C 66/7375 138/104 |
| 2001/0029989 A1 | | 10/2001 | Paz | |
| 2006/0288756 A1 | * | 12/2006 | De Meurechy ...... | G01N 17/006 73/1.01 |
| 2009/0013806 A1 | * | 1/2009 | Miller .................... | F16L 55/48 73/865.8 |
| 2009/0150094 A1 | * | 6/2009 | Van Velsor ............ | G01N 29/07 702/39 |
| 2011/0167914 A1 | * | 7/2011 | Sutherland ................ | F17D 1/00 73/643 |
| 2016/0146971 A1 | * | 5/2016 | Gerling .................. | G01V 99/00 702/5 |

\* cited by examiner

*Primary Examiner* — Lisa Caputo
*Assistant Examiner* — Nathaniel T Woodward

(57) ABSTRACT

A pipeline identification and calibration apparatus coupled to a pipe communicates with an in-line inspection tool to help a user to determine an extent of damage suffered by the pipe is provided. The apparatus includes a communication sheet coupled to the pipe and having a pipe calibration area and a pipe identification area, the pipe calibration area having a plurality of etchings, voids or magnetic inserts having variable dimensions and spacing between adjacent members of either the etchings, voids or the magnetic inserts. The user compares data generated by the in-line inspection tool to the etchings, voids or magnetic inserts on the pipe calibration area of the communication sheet to determine the extent of damage to the pipe.

7 Claims, 2 Drawing Sheets

PIPELINE IDENTIFICATION AND CALIBRATION APPARATUS

RELATED APPLICATION

The application claims priority to provisional patent application U.S. Ser. No. 62/183,366 filed on Jun. 23, 2015, the entire contents of which is herein incorporated by reference.

BACKGROUND

The embodiments herein relate generally to pipelines for transporting fluids.

Metallic pipelines are used to gather, transport, and deliver fluids for many purposes. In-Line Inspection (ILI) often employs Magnetic Flux Leakage (MFL) technologies in order to identify and map pipeline anomalies. These ILI and MFL technologies continue to advance and have been the preferred pipeline assessment tool for many years.

Several pipeline identification and positioning systems are disclosed in U.S. Patent Application Publication 20010029989, which includes a plurality of marker coupons disposed throughout the pipe to provide identification information. However, this is disadvantageous because the coupons are spread throughout the pipe instead of being organized together at a single location. This is inefficient and increases the time necessary for the user to gather all of the information from the coupons. In addition, the existence of coupons located throughout many different locations on the pipeline may interfere with the in-line inspection tool's ability to accurately read the pipe.

As such, there is a need in the industry for a pipeline identification and calibration apparatus that overcomes the limitations of the prior art. Specifically, there is a need for a device which would be affixed to the inside or outside of any pipe or pipeline element that will communicate to ILI-MFL devices, and provide a multi-dimensional calibration basis to ILI-MFL devices, while also providing a sacrificial or protective medium to help diminish internal corrosion.

SUMMARY

A pipeline identification and calibration apparatus coupled to a pipe and configured to communicate with an in-line inspection tool to help a user to determine an extent of damage suffered by the pipe is provided. The pipeline identification and calibration apparatus comprises a communication sheet coupled to the pipe and configured to transmit information pertaining to the pipe to the in-line inspection tool, the communication sheet comprising a pipe calibration area and a pipe identification area, the pipe calibration area comprising a plurality of etchings or voids comprising variable dimensions and spacing between adjacent members of either the etchings or the voids, wherein the user can compare data generated by the in-line inspection tool to the etchings or voids on the pipe calibration area of the communication sheet to determine the extent of damage to the pipe.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

The pipeline identification and calibration apparatus is intended to resolve the issues of the prior art as well as provide other tangible advantages to pipeline operators (not shown).

Figure 1:
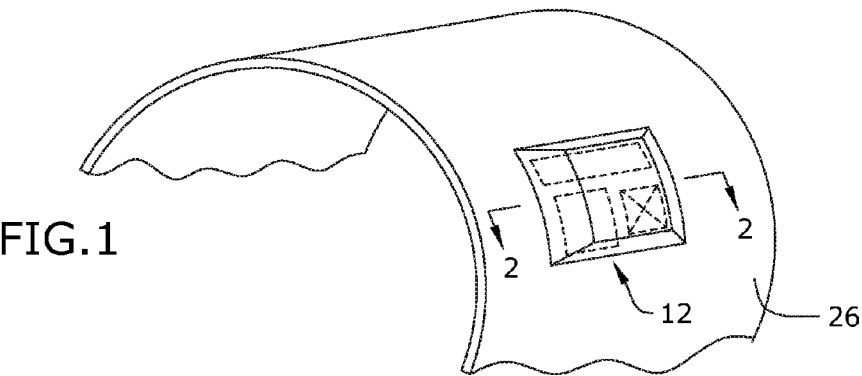
FIG. 1 depicts a cutaway perspective view of certain embodiments of the pipeline identification and calibration apparatus.
Figure 4:
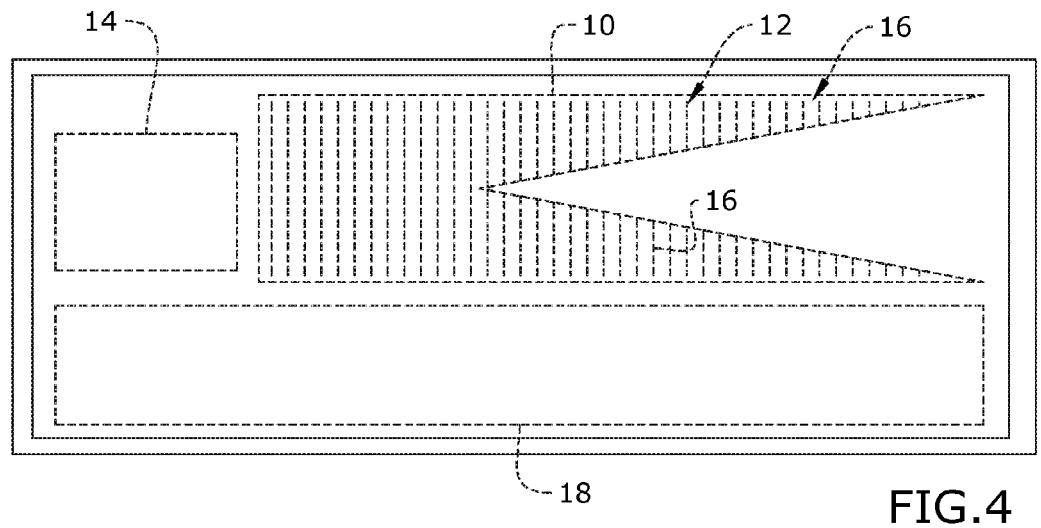
FIG. 4 depicts a section view of certain embodiments of the pipeline identification and calibration apparatus taken along line 4-4 in FIG. 2.
Figure 5:
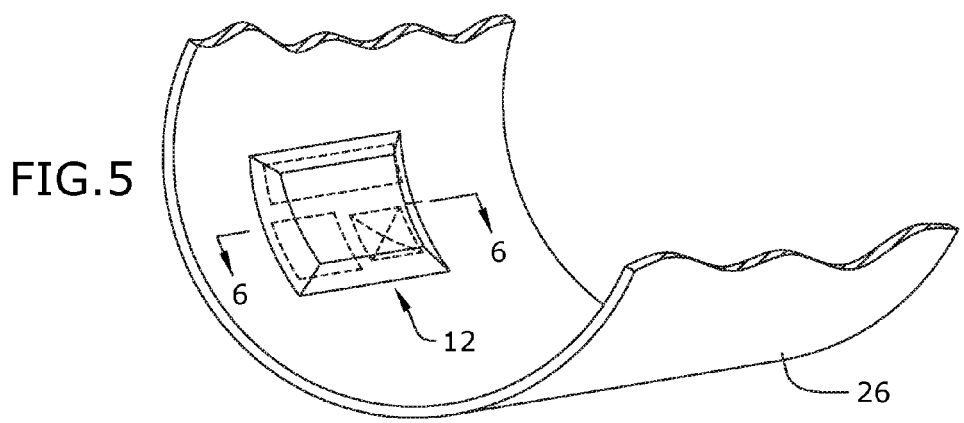
FIG. 5 depicts a cutaway perspective view of an alternative embodiment of the pipeline identification and calibration apparatus.

As depicted in FIGS. 1 and 5, the pipeline identification and calibration apparatus generally comprises metallic communication sheet 12 and is configured to be coupled to carrier pipe 26 by epoxy or thermite welding. The apparatus may be coupled to the outside wall of carrier pipe 26 as shown in FIG. 1 or the inside wall of carrier pipe 26 as shown in FIG. 5. In alternative embodiments, the pipeline identification and calibration apparatus may be coupled to any pipeline elements such as joints, fittings and other equipment. For simplicity, FIGS. 2-4 illustrate exemplary embodiments of the apparatus coupled to the outside wall of carrier pipe 26.

Figure 2:
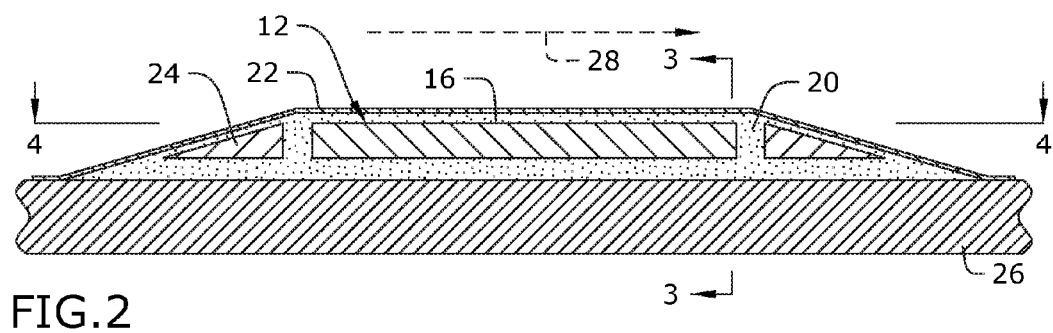
FIG. 2 depicts a section view of certain embodiments of the pipeline identification and calibration apparatus taken along line 2-2 in FIG. 1.
Figure 3:
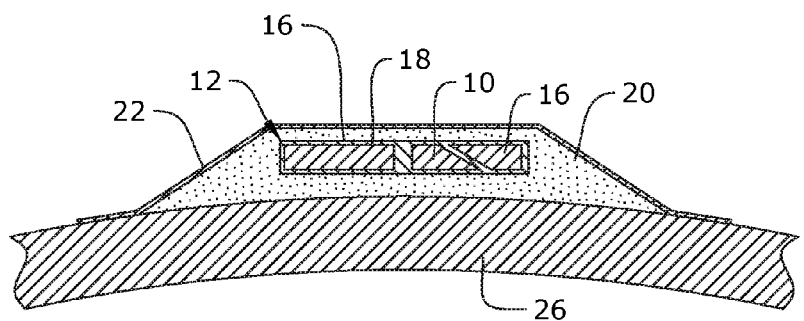
FIG. 3 depicts a section view of certain embodiments of the pipeline identification and calibration apparatus taken along line 3-3 in FIG. 2.

As depicted in FIGS. 2-4, the pipeline identification and calibration apparatus comprises metallic communication sheet 12, which is preferably a pipe steel laser cut member coupled to carrier pipe 26. In certain embodiments, metallic communication sheet 12 is made from the same material as carrier pipe 26. Metallic communication sheet 12 comprises calibration area 10, logo area 14 and pipe identification area 18, and is configured to communicate information pertaining to carrier pipe 26 to the pipeline operator and/or in-line inspection tool (not shown).

Calibration area 10 comprises a plurality of calibration members 16 disposed thereto, which may comprise etchings and/or voids having variable dimensions of length, width and depth gauging, and spacing between adjacent members of the etchings and/or voids. In one embodiment, calibration members 16 comprise a plurality of etchings and/or voids disposed throughout calibration area 10. In an alternative embodiment, calibration members 16 comprise a plurality of individual magnetic elements disposed throughout calibration area 10.

Logo area 14 of metallic communication sheet 12 may comprise a plurality of symbols, letters or other graphic images to represent a manufacturer of carrier pipe 26. In an alternative embodiment, logo area 14 may comprise other information such as GIS data, which may include latitude, longitude and elevation information pertaining to carrier pipe 26. In an alternative embodiment, logo area 14 may comprise other information such as location identification, part numbers, or the like.

Pipe identification area 18 of metallic communication sheet 12 is configured to communicate identification information pertaining to carrier pipe 26 by using a barcoding technology or other similar-type technology. In one embodiment, pipe identification area 18 comprises a barcode (not shown) that communicates identification information such as a serial number or Batch ID of carrier pipe 26. Communicating the serial number or batch ID of each carrier pipe 26 or pipeline element to the ILI/MFL tool will give the pipeline analysts and engineers a way to trace information about the pipe/pipeline element when purchased including, but not limited to, the manufacturer, steel source, diameter, wall thickness, SMYS, material and product test data from the manufacturer.

Sacrificial medium 20 is disposed around metallic communication sheet 12 and is completely bonded to carrier pipe 26. Sacrificial medium 20 serves as a protective medium and is a filler, which produces no additional material degradation to the pipeline steel while also offering a significantly different magnetic signature. In certain embodiments, sacrificial medium 20 is composed of a strongly electrolytic metal that would allow the sacrificial medium to shed electrons into the carrier pipeline in the event that an internally corrosive reaction is completed across an electrolytic cell inside the pipeline. The sacrificial medium would provide preferential reduction over that of the carrier pipe in the event of an oxidation-reduction reaction. Sacrificial medium 20 can also be made from a material with a melting temperature far below that of carrier pipe 26 so that the apparatus can be attached or removed easily by the addition of sufficient heat. In a preferred embodiment, sacrificial medium 20 is made from zinc. However, in alternative embodiments, sacrificial medium 20 may comprise other materials including, but not limited to, aluminum, plastic, air, or the like.

In one embodiment, at least one insert 24 is disposed within sacrificial medium 20. Insert 24 may be made from titanium or another metal, and is configured to prevent pigging damage to metallic communication sheet 12. One or more protective sheets 22 are disposed around metallic communication sheet 12, sacrificial medium 20 and insert 24. Each protective sheet 22 is configured to protect the encased components and prevent internal gouging. In one embodiment, protective sheet 22 is made from zinc foil. However, alternative materials may be used instead.

In operation, one or more pipeline identification and calibration apparatuses are coupled to carrier pipe 26 and/or pipeline elements. ILI/MFL tools (not shown) are passed through carrier pipe 26 in direction 28. Each pipeline identification and calibration apparatus communicates specific information to the ILI/MFL tool as it passes by the apparatus. This process permits a user (not shown) to easily retrieve identification information from pipe identification area 18. At the same time, each pipeline identification and calibration apparatus provides calibration measurements from calibration area 10 of metallic communication sheet 12 to the ILI tool. This permits the user to compare data generated by the ILI tool with information from calibration area 10 to determine the extent of damage suffered by carrier pipe 26.

It shall be appreciated that the components of the pipeline identification and calibration apparatus described in several embodiments herein may comprise any alternative known materials in the field and be of any color, size and/or dimensions. It shall be appreciated that the components of the pipeline identification and calibration apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A pipeline identification and calibration apparatus coupled to a pipe via a pipeline element and configured to communicate with an in-line inspection tool and help a user to determine an extent of damage suffered by the pipe, the pipeline identification and calibration apparatus comprising:
a communication sheet directly coupled to the pipeline element and configured to transmit information pertaining to the pipeline element to the in-line inspection tool, the communication sheet comprising a pipe calibration area and a pipe identification area, the pipe calibration area comprising a plurality of etchings or voids comprising variable dimensions and spacing between adjacent members of either the etchings or the voids;
wherein the in-line inspection tool is configured to compare data generated by the in-line inspection tool to the etchings or voids on the pipe calibration area of the communication sheet to determine the extent of damage to the pipe.

2. The pipeline identification and calibration apparatus of claim 1, wherein the pipe identification area comprises identification information pertaining to the pipe, wherein the identification information comprises the serial number or batch ID of the pipe.

3. The pipeline identification and calibration apparatus of claim 2, wherein the pipe identification area comprises a barcode configured to transmit signals pertaining to the identification information.

4. The pipeline identification and calibration apparatus of claim 3, further comprising a logo region.

5. The pipeline identification and calibration apparatus of claim 4, further comprising a sacrificial medium disposed around the communication sheet, where this sacrificial medium protects the apparatus from physical damage and helps to protect the pipeline from corrosion.

6. The pipeline identification and calibration apparatus of claim 5, further comprising at least one insert embedded within the sacrificial medium and configured to prevent pigging damage to the communication sheet.

7. The pipeline identification and calibration apparatus of claim 6, further comprising a protective sheet disposed around the sacrificial medium, the communication sheet and the at least one insert.

\* \* \* \* \*